US006953135B2

(12) United States Patent
Litton et al.

(10) Patent No.: US 6,953,135 B2
(45) Date of Patent: Oct. 11, 2005

(54) LIQUID DELIVERY APPARATUS FOR BICYCLE

(75) Inventors: Linda Litton, Sausalito, CA (US); Alexander Ilich, Seaside, CA (US); Joel Ecklund, Sausalito, CA (US)

(73) Assignee: NRZ, Inc., Sausalito, CA (US)

( * ) Notice: Subject to any disclaimer, the term of this patent is extended or adjusted under 35 U.S.C. 154(b) by 173 days.

(21) Appl. No.: 10/212,186

(22) Filed: Aug. 2, 2002

(65) Prior Publication Data

US 2003/0098324 A1 May 29, 2003

Related U.S. Application Data

(60) Provisional application No. 60/334,156, filed on Nov. 28, 2001.

(51) Int. Cl.$^7$ ................................................ B62J 11/00
(52) U.S. Cl. ....................... 224/414; 224/420; 224/421; 224/427; 224/926; 280/288.4
(58) Field of Search ................................ 224/414, 420, 224/421, 425, 427, 926; 280/288.4; 222/211, 212, 215, 335, 527, 537, 540, 566

(56) References Cited

U.S. PATENT DOCUMENTS

| 4,095,812 A | | 6/1978 | Rowe | |
|---|---|---|---|---|
| 4,274,566 A | | 6/1981 | Rowe | |
| 4,441,638 A | | 4/1984 | Shimano | |
| 4,815,635 A | | 3/1989 | Porter | |
| 4,911,339 A | | 3/1990 | Cushing | |
| 4,957,227 A | * | 9/1990 | Trimble | 280/288.4 |
| 5,024,358 A | * | 6/1991 | Reichert et al. | 224/248.7 |
| 5,062,591 A | | 11/1991 | Runkel | |
| 5,104,016 A | | 4/1992 | Runkel | |
| 5,115,952 A | | 5/1992 | Jenkins | |
| 5,119,978 A | | 6/1992 | Kalamaras et al. | |
| 5,143,390 A | | 9/1992 | Goldsmith | |
| 5,158,218 A | | 10/1992 | Wery | |
| 5,178,308 A | * | 1/1993 | Endre | 220/669 |
| 5,201,442 A | | 4/1993 | Bakalian | |
| 5,215,231 A | | 6/1993 | Paczonay | |
| 5,265,769 A | | 11/1993 | Wilson | |
| D345,134 S | | 3/1994 | Meaker | |
| 5,301,858 A | | 4/1994 | Hollander | |
| 5,301,860 A | | 4/1994 | Paczonay | |
| 5,326,124 A | | 7/1994 | Allemang | |
| 5,358,142 A | | 10/1994 | Holmes | |
| 5,419,154 A | * | 5/1995 | Christoff | 248/311.2 |
| 5,593,126 A | * | 1/1997 | Muderlak | 224/427 |
| 5,607,087 A | | 3/1997 | Wery et al. | |
| 5,788,134 A | | 8/1998 | Matic, Jr. | |
| 6,196,474 B1 | * | 3/2001 | Hillerson | 280/288.4 |
| 6,247,619 B1 | | 6/2001 | Gill et al. | |
| 6,401,997 B1 | * | 6/2002 | Smerdon, Jr. | 224/414 |

* cited by examiner

*Primary Examiner*—Gary E. Elkins
(74) *Attorney, Agent, or Firm*—Anthony T. Cascio (57) ABSTRACT

A liquid delivery apparatus for a bicycle includes a container adapted to contain a liquid and a tube having a first end and a second end. The container is releasably mountable to a selected one of a seat rail and a seat post of the bicycle. The container has a first opening and a second opening. The first opening is adapted to receive a liquid and is disposed above a normal liquid level line of the liquid when present in the container. The second opening is disposed below the normal liquid level line. The first end of the tube is attachable to the container in fluid communication with the second opening. The liquid when present in the container is delivered to a mouthpiece attached to the second end of the tube.

13 Claims, 7 Drawing Sheets

LIQUID DELIVERY APPARATUS FOR BICYCLE

CROSS-REFERENCE TO RELATED APPLICATIONS

This application is entitled to the benefit of Provisional Patent Application Ser. No. 60/334,156, filed Nov. 28, 2001.

BACKGROUND OF THE INVENTION

1. Field of the Invention

This apparatus relates to bicycle accessories and more specifically to a novel seat-mounted liquid delivery apparatus that provides to a cyclist "hands-free" delivery of consumable liquid while riding a bicycle.

2. Description of the Related Art

Prior known apparatus useful for accessing and drinking water or other liquids while bicycling include a water bottle retrievable from a bottle cage mounted on the frame of the bicycle or a tube connected to a reservoir or container of liquid kept in a backpack.

Although the prior known apparatus is generally useful for the casual rider, such prior apparatus exhibits limitations and disadvantages for the competitive or extreme sport cyclist. For example, when a cyclist is required to reach for a water bottle or any like container for hydration liquid while riding, the cyclist may be prevented from receiving water or liquid in a timely manner, thereby resulting in at least the onset of dehydration. A cyclist should always have readily available sufficient and adequate hydration, and such hydration is especially crucial in racing and mountain bicycling. However, a disadvantage and limitation of the prior known apparatus is that, while reaching for a water bottle or the like, the cyclist may be distracted by having to take his eyes off the road or path in order to reach for the water bottle.

Another disadvantage and limitation is that, while reaching for a water bottle or the like, the cyclist can only have one hand on the handlebars. Accordingly, the cyclist may become imbalanced causing the cyclist to veer from the intended path, causing a collision with another cyclist, or lose balance completely.

A device mounted to the back of the cyclist requires the cyclist to reach in search of the delivery tube, causing distraction. On frame-mounted devices, pulling the bottle from the bottle cage can impact balancing and steering of the bicycle. Examples of such devices are illustrated in U.S. Pat. Nos. 4,441,638 (Shimano), and 4,386,721 (Shimano). Another factor is the likely visual impairment of the cyclist from tilting one's head back to drink from a handheld bottle while riding.

To prevent having to reach for a water bottle, or carry excessive weight on the back, various frame-mounted hydration devices have been designed to allow a cyclist access to liquid from a tube mounted on the handlebars. The fluid delivered is under pressure. However, these devices still require user interaction in order to receive pressurized fluid with the disadvantage and limitation of again needing to remove the grip of one hand from the handlebar.

For example, in this class of devices, a method for dispensing liquid from a bottle into a mouthpiece via a pulled lever located on the handlebars was introduced in U.S. Pat. Nos. 5,215,231 (Paczonay), 5,301,860 (Paczonay), and D345,134 (Meaker). U.S. Pat. No. 4,911,339 (Cushing) discloses a valve which, when depressed, forces air into a pleated bellows located at the bottom of the container, forming a chamber for holding compressed air.

U.S. Pat. No. 4,815,635 (Porter) discloses a diaphragm-type pump connected to a water bottle and flexible tubing. A lever located on the handlebars is pressed or pulled in order to operate the pump. These arrangements require the cyclist to pump the compression device for each drink, which is inconvenient and could cause fatigue. U.S. Pat. No. 5,358,142 (Holmes) discloses a mouth-pressurized drinking bladder that requires blowing air through the tube in order to pressurize the bladder for each drink, thus causing additional fatigue and discomfort.

There are various pressurized water delivery apparatuses that require a one-time inflation of the container for the life of the container's contents. The container is pressurized through a hand pump and check valve. U.S. Pat. No. 5,062,591 (Runkel) discloses a bladder that is pressurized by a hand pump and a check valve. U.S. Pat. No. 5,158,218 (Wery) discloses a wedge-shaped vessel, which, once pressurized, is inserted into a cage that actuates a check valve for water flow. This V-shaped vessel can be mounted on a traditional bicycle frame only. U.S. Pat. No. 5,326,124 (Allemang) connects a water bottle to tubing attached to a pump where water is passed through a valve allowing either a spray of water or delivery access through a mouthpiece.

There are many disadvantages and limitations in having to pull a lever, blow air, or use a hand pump to receive pressurized water flow. The requirement of interaction from the cyclist in order to receive liquid while cycling defeats the objective of a frame-mounted "hands-free" delivery apparatus. Any additional steps require training and can be cumbersome for the cyclist. Finally, compression devices require extensive manufacturing costs that could adversely affect the product's affordability.

Other disadvantages and limitations to the U.S. patents cited above include the unsuitable location of the water bottles, normally mounted onto the bicycle frame, which prohibits storage of large quantities of liquid due to an improper weight balance. These apparatus normally require a minimum of two water bottles and further contribute to aerodynamic drag.

When an unpressurized water bottle is positioned upright on the lower frame of the bicycle, the cyclist has to draw heavily on a mouthpiece in order to obtain liquid flow from the water bottle via a connecting tube. Examples of such apparatus are disclosed in U.S. Pat. Nos. 4,095,812 (Rowe), 5,301,858 (Hollander), 5,788,134 (Matic, Jr.), 5,115,952 (Jenkins), and 5,119,978 (Kalamaras).

Accordingly, there exists a need for a liquid delivery apparatus that overcomes one or more of the disadvantages and limitations of the prior art. There is a further need for a liquid delivery apparatus that does not require pressurization, yet allows for the free flow of liquid without excessive drawing suction required at the mouthpiece. There is also a need for a liquid delivery apparatus that does not induce aerodynamic drag.

SUMMARY OF THE INVENTION

It is an object of the present invention to overcome one or more disadvantages and limitations of the prior art hereinabove enumerated.

According to the present invention, a liquid delivery apparatus for a bicycle includes a container adapted to contain a liquid and a tube having a first end and a second end. The container is releasably mountable to a selected one of a seat rail and a seat post of the bicycle. The container has a first opening and a second opening. The first opening is adapted to receive a liquid and is disposed above a normal liquid level line of the liquid when present in the container. The second opening is disposed below the normal liquid level line. The first end of the tube is attachable to the container in fluid communication with the second opening. The liquid when present in the container is delivered to the second end.

A feature of the present invention is that pressure of the liquid within the container above the second opening passively provides pressure on liquid flowing through the tube. This feature advantageously eliminates the need for pressure devices or for having the rider exert excessive draw on a mouthpiece to draw fluid from a conventional container.

Another feature of the present invention is that the container is mounted behind the rider. This mounting position advantageously does not contribute to aerodynamic drag.

In one further embodiment of the present invention, the second end of the tube, with a mouthpiece is maintained at a level slightly above the liquid level line. This further feature of the invention advantageously inhibits the flow of fluid through the tube when no draw is being made, and enhances the above described advantages.

In yet another further embodiment of the present invention, the container may contain a baffle, dividing it into two chambers. The baffle advantageously allows for the selective delivery of two different types of liquid to the rider.

DESCRIPTION OF THE EXEMPLARY PREFERRED EMBODIMENTS

Referring now to FIGS. 1–5, there is shown liquid delivery apparatus 10 for a bicycle 12. The bicycle 12 has a seat 14, a frame horizontal bar 16 and handlebar 18. The seat 14 has a seat rail 20 and a seat post 22.

Figure 1:
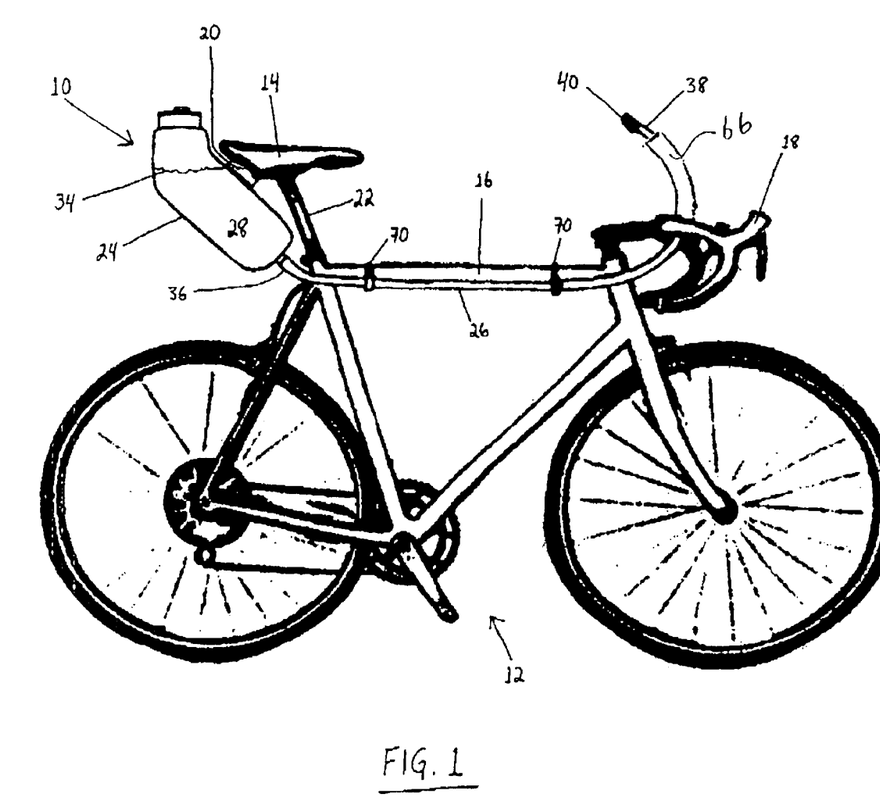
FIG. 1 illustrates a liquid delivery apparatus constructed in accordance with the principles of the present invention.

In accordance with the present convention, a liquid delivery apparatus 10 includes a container 24 and a tube 26. The container 24 may be releasably mounted to a selected one of the seat rail 20 and the seat post 22. The container 24 is adapted to contain a liquid 28.

Figure 2:
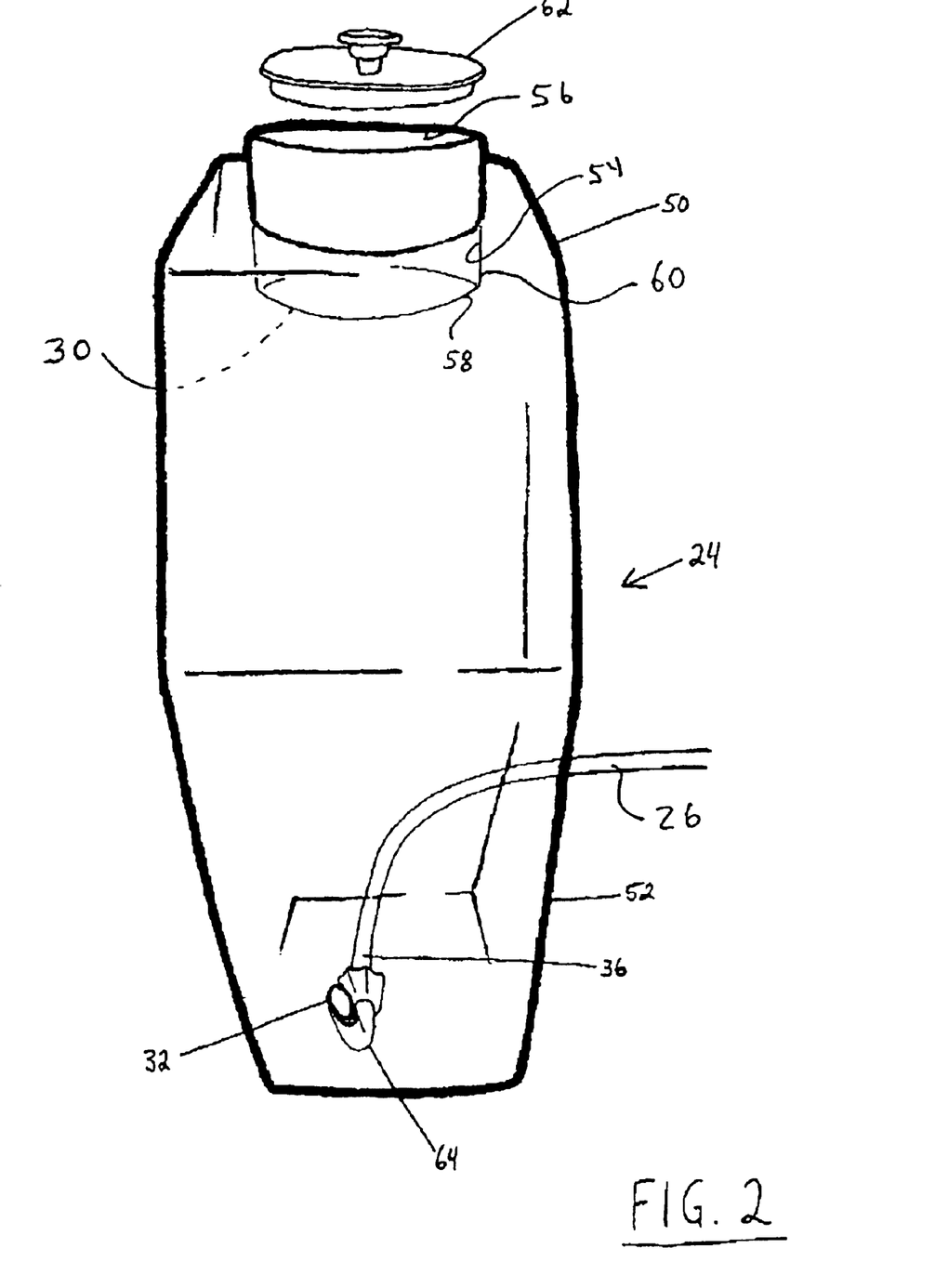
FIG. 2 is a view in elevation of the container of FIG. 1.

The container 24 has a first opening 30 and a second opening 32. The first opening 30 of the container 24 is adapted to receive the liquid 28. Accordingly, the first opening 30 is disposed above a normal liquid level line 34 of the liquid 28 when it is present in the container 24. Similarly, the second opening 32 of the container 24 is disposed below the normal liquid level line 34.

The tube 26 has a first end 36 and a second end 38. The first end 36 of the tube 26 is attachable to the container 24 in fluid communication with the second opening 32. The second end 38 of the tube 26 is generally positionable above the liquid level line 34, as best seen in FIG. 1. The liquid, when present in the container 24, is thus deliverable to the second end 38 of the tube 26.

Figure 3:
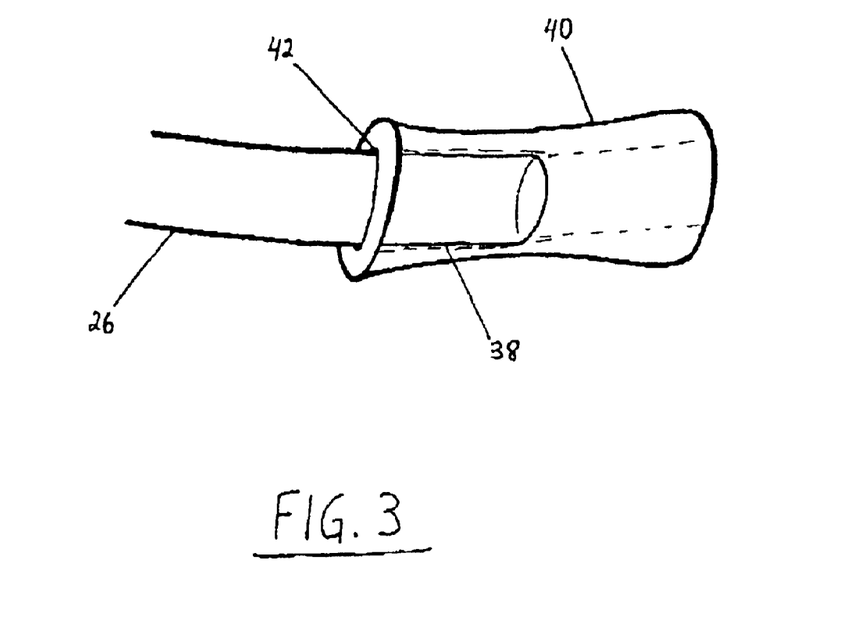
FIG. 3 is a fragmentary detail of a portion of FIG. 1 showing one embodiment of a mouthpiece.

The liquid delivery apparatus 10 may further include a mouthpiece 40, as best seen in FIG. 3. The mouthpiece 40 has an orifice 42 therethrough. The second end 38 of the tube 26 is attachable to the mouthpiece 40 in fluid communication with the orifice 42.

Figure 4:
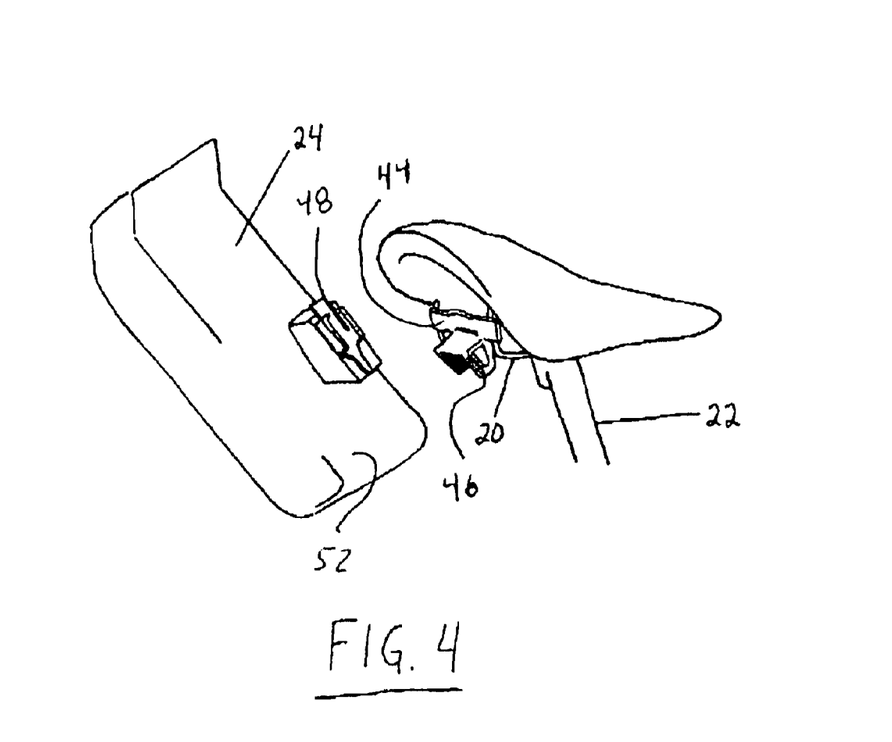
FIG. 4 is an exploded view illustrating in greater detail the mounting bracket of FIG. 1.

The liquid delivery apparatus 10 may further include a mounting bracket 44, as best seen in FIG. 4. The mounting bracket 44 is adapted to be normally engaged to a selected one of the seat rail 20 and a seat post 22 in a conventional manner. The mounting bracket 44 has a mounting tab 46 extending upwardly rearward therefrom. The container 24 further has an exterior slot 48. The tab 46 is receivable in the slot 48 in slideable engagement.

As best seen in FIG. 2, the container 24 has a top portion 50 and a bottom portion 52, wherein the bottom portion 52 is angularly disposed with respect to the top portion 50. By providing such angle, the bottom portion 52 may be partially disposed under the seat 14 when the container 24 is mounted to a respective one of the seat rail 20 and the seat post 22. Preferably, the slot 48 is disposed on the bottom portion 52.

The top portion 50 of the container 24 may further have a generally cylindrical recess 54 defined by a generally cylindrical wall 56 and an end wall 58 disposed at a distal end 60 of the cylindrical wall 56. In this embodiment of the present invention, the first opening 30 of the container 24 is disposed in the end wall 58. The recess 54 is adapted to receive an inverted commercially available liquid containing bottle (not shown) to introduce liquid into the container 24.

When such commercially available bottle is not disposed in the recess 54, the container 24 may further include a cap 62 removably disposed in the recess 54. The cap 62 may further be in engagement with the cylindrical wall 56.

To control the flow rate of the liquid through the tube 26, the container 24 may further include a flow spigot 64 attached to the container 24. The spigot 64 is interposed the second opening 32 of the container 24 and the first end 36 of the tube 26.

Figure 5:
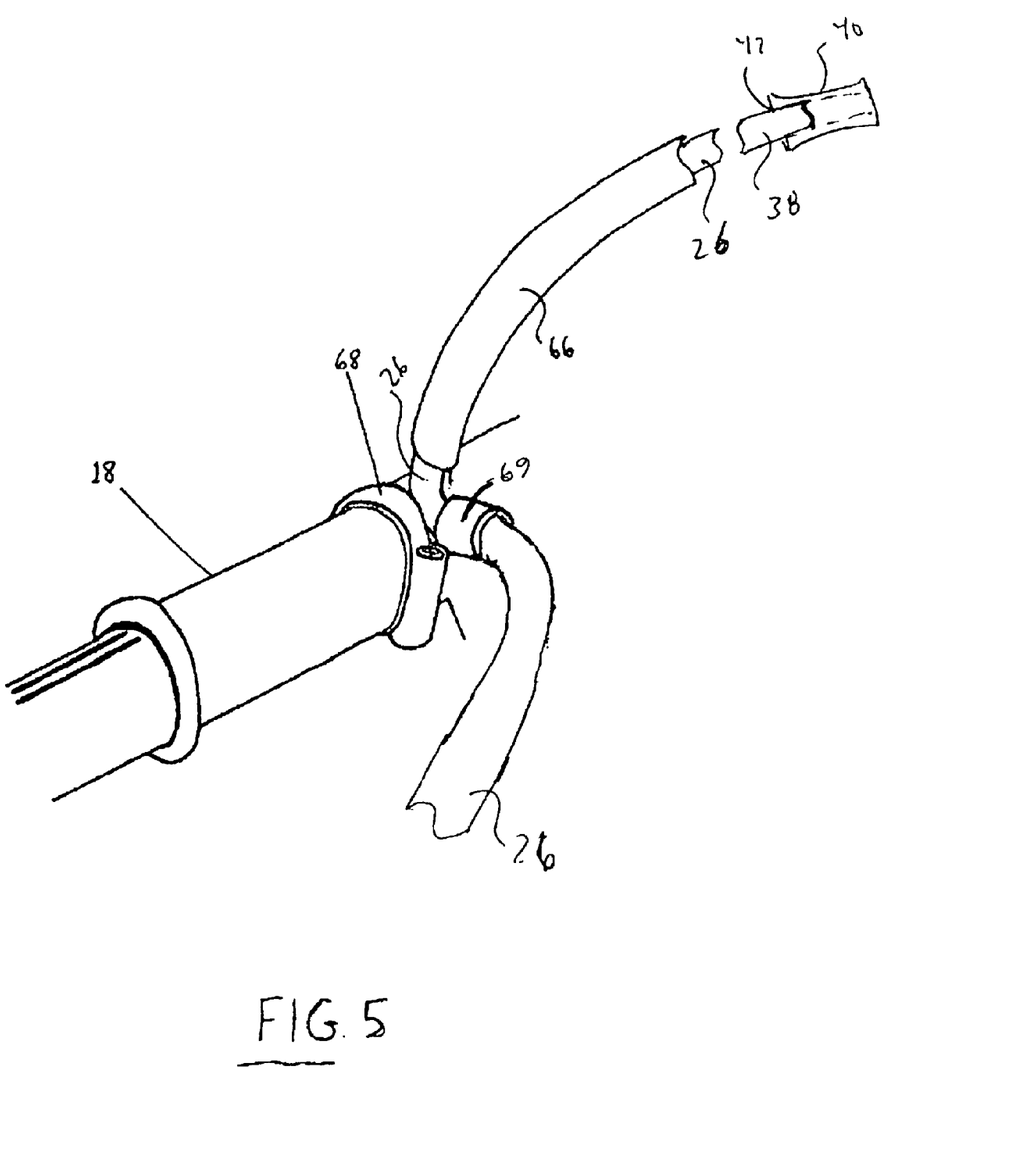
FIG. 5 is a fragmentary detail of a clamp and sheath.

To provide for the mouthpiece 40 to remain above the liquid level line 34, thereby preventing unwanted flow of the liquid 28 through the tube 26, the liquid delivery apparatus 10 may further include a flexible, semi-rigid tube sheath 66, as best seen in FIG. 5. A portion of the tube 26 is disposed within the tube sheath 66 such that the second end 38 of the tube 26 projects outwardly from the tube sheath 66.

To secure the tube 26 to the handlebar 18, a clamp 68 may be provided. The clamp 68 includes a tubular fitting 69. The clamp 68 is secured to the handlebar 18. The tube 26 is disposed through the tubular fitting 69. The tube sheath 66 is placed over the tube 26 between its second end 38 and the fitting 69. The clamp 68 may be a conventional screw type clamp that secures a flange on the fitting 69 to the handlebar 18.

To secure the tube 26 to the bicycle 12, the liquid delivery apparatus may further include a pair of straps 70. Each of the straps 70 is adapted to secure a portion of the tube 26 to the frame horizontal bar 16. The straps may be conventional fabric hook and loop fasteners, commonly available under the trademark Velcro™.

In the use of the liquid delivery apparatus 10 as hereinabove described, a rider of the bicycle 12 need now only lean slightly forward to engage the mouthpiece 40 and commence the delivery of the liquid 28 from the container 24 through the tube 26 to the mouthpiece 40. The liquid 28 is drawn through the tube 26 similarly as drawing liquid through a straw. By having the mouthpiece 40 held by the tube sheath 66 slightly above the normal liquid level line 34, the flow of liquid through the tube 26 is inhibited, yet the rider need only induce a slight draw at the mouthpiece to commence fluid flow.

As can be seen from the above description, the rider need not divert attention from the forward movement of the bicycle 12. Furthermore, by eliminating the need to reach for a water bottle, the rider is now able to keep both hands on the handlebar 18, thereby maintaining balance over all types of road or trail conditions. By placing the container 24 behind and slightly under the seat 14, the container does not contribute to aerodynamic drag, which is an important consideration in racing.

The basic embodiment of the liquid delivery apparatus 10 described above may also be modified to allow for two different liquids, such as water and an electrolyte supplement to be selectively delivered to the rider of the bicycle 12. These modifications preserve the above described advantages of the present invention while enhancing its usefulness and functionality.

As best seen in FIGS. 6–9, a modified container 24' may include an interior baffle 72 to define a first chamber 74 and a second chamber 76 in the container 24'. The container 24' has the first opening 30 and second opening 32 as hereinabove described. However, in the container 24', the second opening 32 is in communication with the first chamber 74. In addition thereto, the container 24' further includes a third opening 78 disposed below the normal liquid level line 34 in communication with the second chamber 76.

Figure 6:
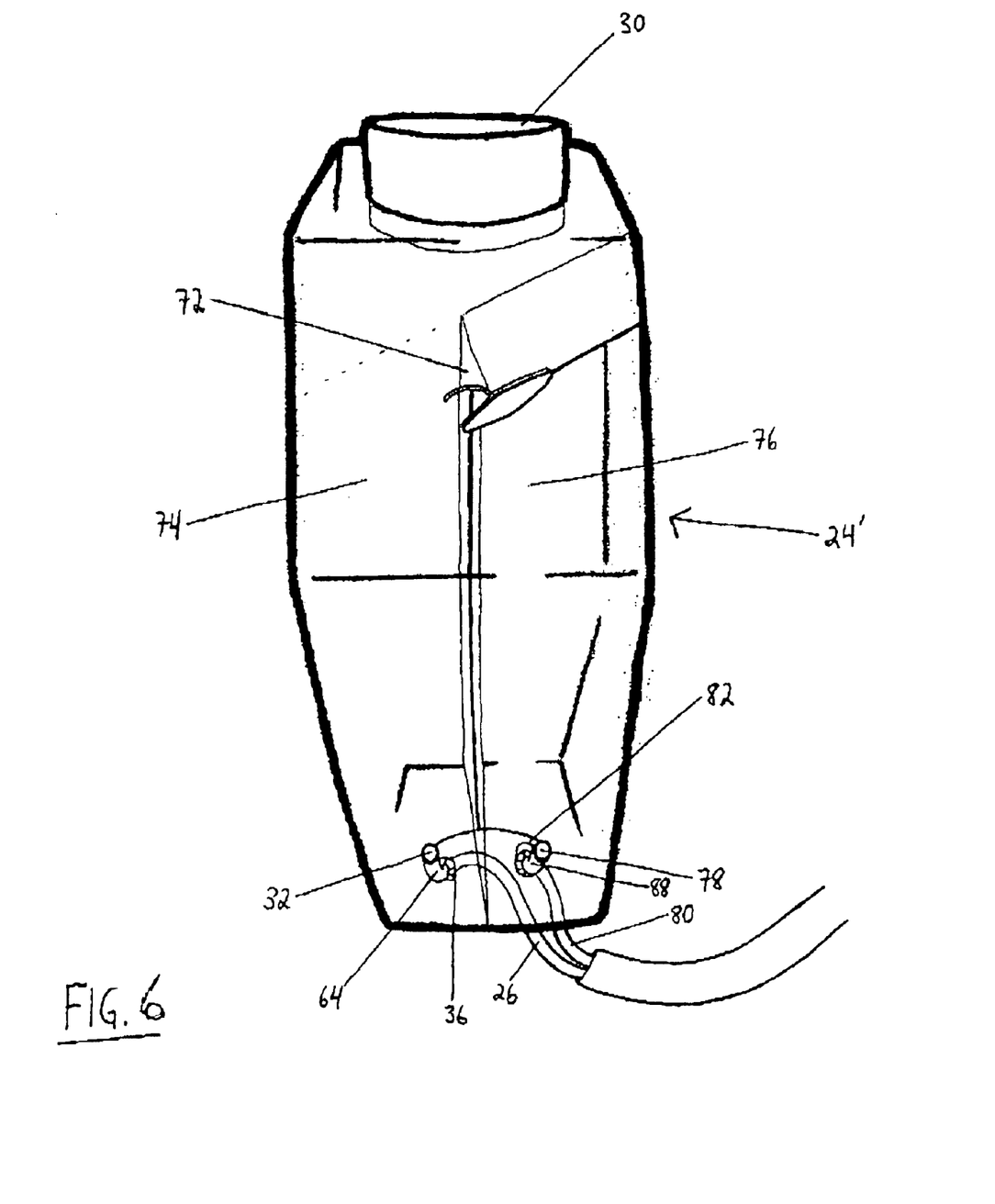
FIG. 6 illustrates a modification to the container of FIG. 2.

Furthermore, in addition to the first tube 26 described above, a second tube 80 is also provided. Similar to the first end 36 and the second end 38 of the first tube 26, the second tube 80 has a first end 82 and a second end 84. The first end 36 of the first tube 26 is attached to the container 24' in fluid communication with the second opening 32 of the container 24'. The first end 82 of the second tube 80 is attached to the container 24' in fluid communication with the third opening 78 of the container 24'. When the liquid 28 is present in the first chamber 74, it is deliverable to the second end 38 of the first tube 26 and when the liquid 28 is present in the second chamber 76 it is deliverable to the second end 84 of the second tube 80.

Furthermore, in addition to the first liquid flow spigot 64 attached to the container 24' interposed the second opening 32 and the first end 36 of the first tube 26, a second liquid flow spigot 88 is attached to the container 24' interposed the third opening 78 and the first end 82 of the second tube 80.

Figure 7:
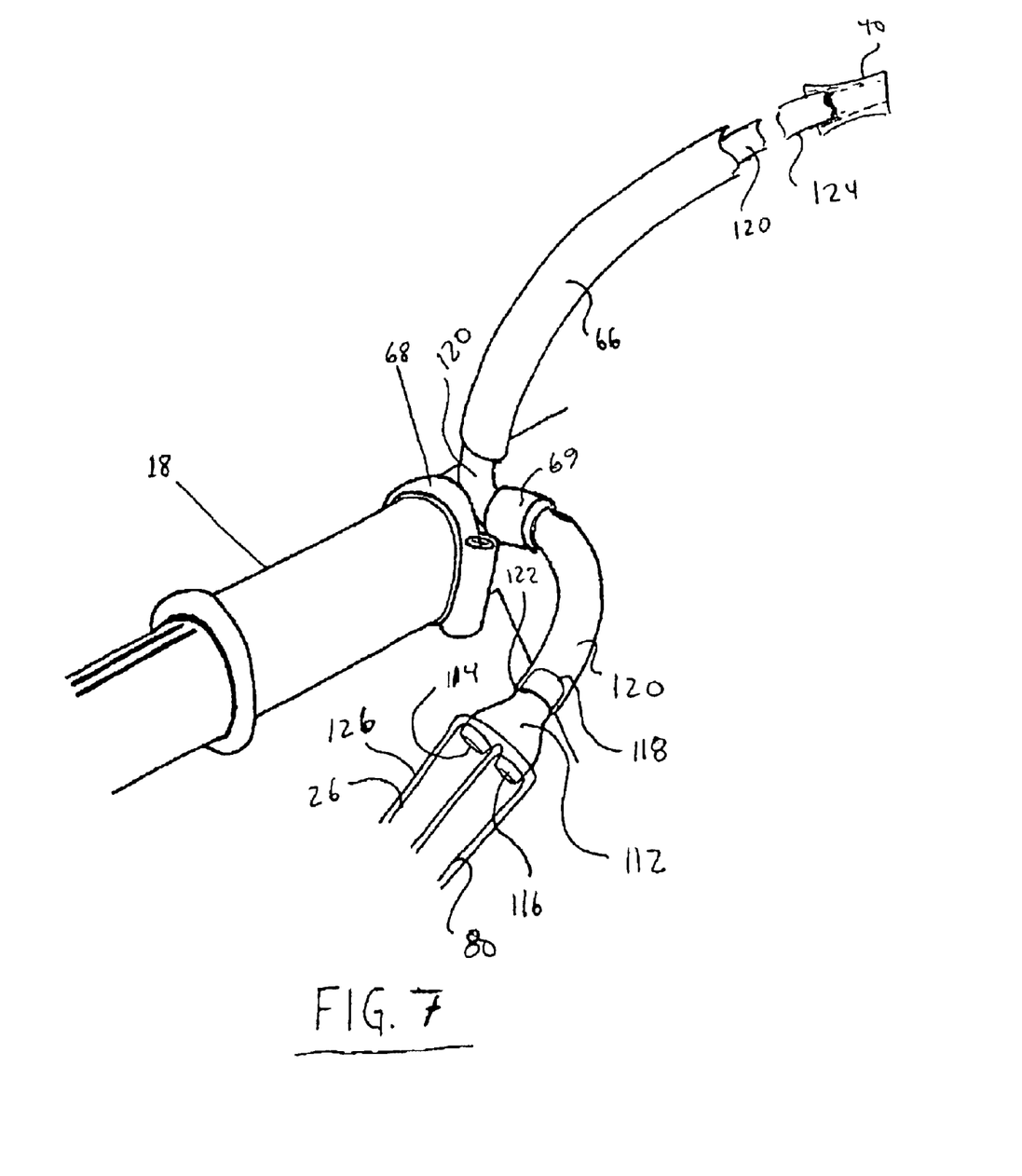
FIG. 7 is a fragmentary view of a clamp and sheath.

To connect the mouthpiece 40 to each of the first tube 26 and the second tube 80, a Y-fitting 112, as best seen in FIG. 7, has it first inlet 114 and its second inlet 116 connected respectively to each of the second end 38 of the first tube 26 and the second end 84 of the second tube 80. An outlet 118 of the Y-fitting 112, in fluid communication with each of the first inlet 114 and the second inlet 116, is connected to an exit tube 120. More particularly, the exit tube 120 has a first end 122 connected to the outlet 118 and a second end 124 normally positionable above the liquid level line 34. The mouthpiece 40 is then connected to the second end 124 of the exit tube 120.

As best seen in FIG. 7, the semi-rigid, flexible sheath 66 may hold the exit tube 120 such that its second end 124 remains above the liquid level line. In this embodiment, the exit tube 120 is disposed through the fitting 69, and the sheath 66 is disposed intermediate the fitting 69 and the second end 124 of the exit tube 120.

Each of the first tube 26 and the second tube 80 may be further enclosed within a second sheath 126 along their respective lengths. Finally, the pair of straps 70 may secure a portion of the second sheath 126 containing each of the first tube 26 and the second tube 80 to the frame horizontal bar 16.

Figure 8:
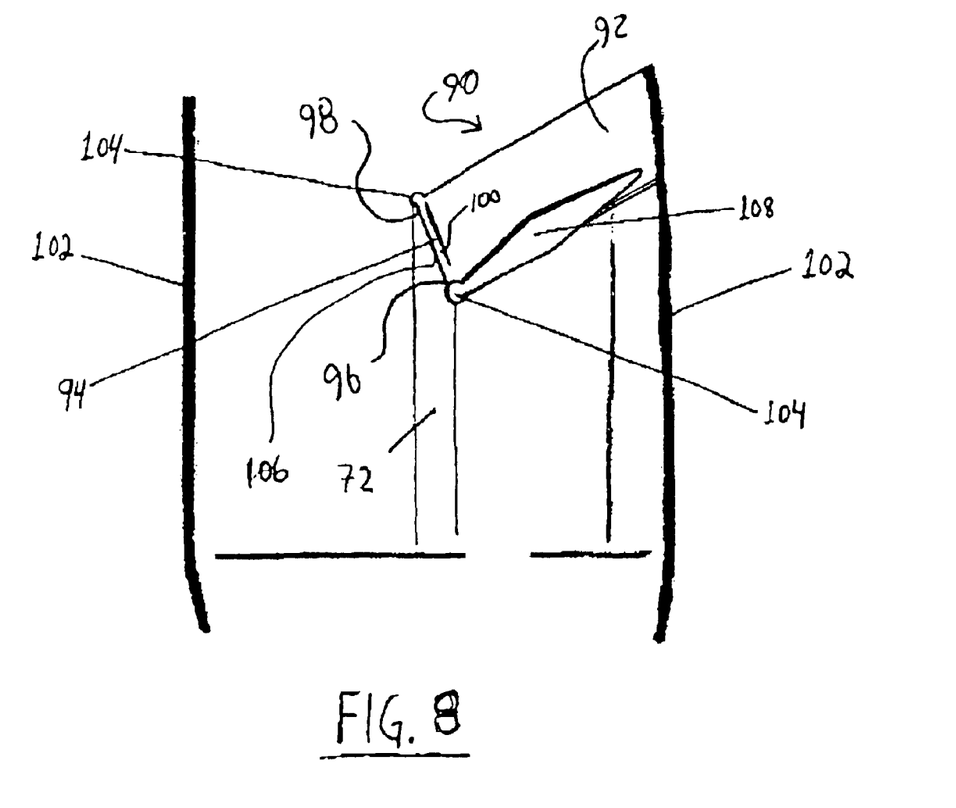
FIG. 8 is a fragmentary view of the container of FIG. 5 showing a detail of the diverter valve and lever.
Figure 9:
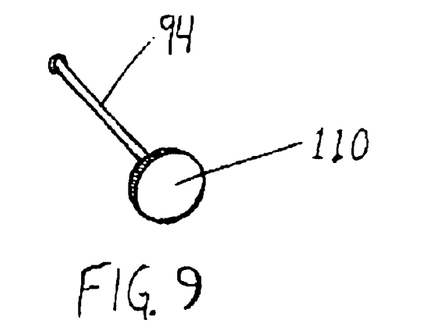
FIG. 9 is an alternative fragmentary view of FIG. 8.

The container 24' may further include a diverter valve 90 disposed intermediate the baffle 72 and the first opening 30, as best seen in FIG. 8. The diverter valve 90 is movable between a first position, as best seen in FIG. 5, and a second position shown in phantom in FIG. 5. The first opening 30 of the container 24' is in communication with the first chamber 74 when the diverter valve 90 is in its first position. Similarly, the first opening 30 of the container 24' is in communication with the second chamber 76 when the diverter valve 90 is in its second position.

The diverter valve 90 may include a flap 92 and a mounting pin 94. The mounting pin 94 has a first end 96, a second end 98 and an axial portion 100 intermediate its first end 96 and its second end 98. The flap 92 radially extends from the axial portion 100.

The container 24' may further have a pair of opposable sidewall portions 102. Each of the sidewall portions 102 has a bore 104 therethrough. The first end 96 of the mounting pin 94 is disposed in rotatable engagement in the bore 104 in a first one of the sidewalls 102 and the second end 98 of the mounting pin 94 is disposed in rotatable engagement in the bore 104 in a second one of the sidewall portions 102. The baffle 72 has an upper edge 106. The mounting pin 94 is disposed along the upper edge 106 of the baffle 72.

To move the diverter valve 90 between its first position and its second position, the diverter valve 90 may further include a lever 108 extending radially from one of the first end 96 and the second end 98 of the mounting pin 94 with the lever 108 being disposed externally of the container 24'. In an alternative embodiment best seen in FIG. 9, the diverter valve 90 may include a knob 110 coaxial with one of the first end 96 and the second end 98 of the mounting pin 94, instead of the lever 108. The knob 110 is also disposed externally of the container 24'.

The flap 92 has an edge 111 shaped commensurately with the form of the container 24' such that the edge 111 of the flap 92 sealingly engages the container 24' when the diverter valve 90 is in either its first position or its second position. By providing for such sealing engagement, when the diverter valve 90 is in its first position, the liquid 28 will be drawn from the first chamber 74 through the first tube 26 to the mouthpiece 40. Similarly, when the diverter valve 90 is in its second position, the liquid 28 will be drawn from the second chamber 76 through the second tube 80 to the mouthpiece 40.

When the diverter valve 90 is in its first position, the liquid 28 in the first chamber 74 is exposed to ambient pressure. Accordingly, when a rider of the bicycle 12 begins to draw fluid from the mouthpiece 40, the liquid 28 in the first chamber 74 will be drawn through the first tube 26 to the exclusion of the liquid 28 in the second chamber 76. Because the second chamber 76 is sealed from ambient pressure, any initiation of drawing of the liquid through the second tube 80 creates a vacuum within the second chamber 76, thereby inhibiting the communication of the liquid 28 from the second chamber 76 to the mouthpiece 40.

Similarly, when the diverter valve 90 is in its second position, the liquid 28 in the second chamber 76 is exposed to ambient pressure. Accordingly, when a rider of the bicycle 12 begins to draw fluid from the mouthpiece 40, the liquid 28 in the second chamber 76 will be drawn through the second tube 80 to the exclusion of the liquid 28 in the first chamber 74. Because the first chamber 74 is sealed from ambient pressure, any initiation of drawing of the liquid through the first tube 26 creates a vacuum within the first chamber 74, thereby inhibiting the communication of the liquid 28 from the first chamber 74 to the mouthpiece 40.

There has been described hereinabove exemplary preferred embodiments of a liquid delivery apparatus for a bicycle. Those skilled in the art may now make numerous uses of, and departures from, the herein above described preferred embodiments without departing from the principles of the present invention disclosed herein. For example, instead of a first tube and a second tube, a Y-connector, similar to Y-fitting 112, may be provided proximate the container 24' to connect to the second and third openings of the container thereby allowing a single tube to extend along the frame horizontal bar 16 to the mouthpiece. To support two different fluids, the container may have an additional opening adjacent its first opening to receive a second bottle. Accordingly, the container may have two chambers, each in communication with a respective one of the bottles, thereby obviating the need for a diverter valve. Accordingly, the present invention is to be defined solely by the lawfully permissible scope of the appended claims.

What is claimed as the invention is:

1. A liquid delivery apparatus for a bicycle wherein said bicycle includes a seat having a seat rail, a seat post, a frame horizontal bar and a handlebar, said apparatus comprising:
    a container adapted to contain a liquid and being releasably mountable to a selected one of said seat rail and said seat post, said container having a first opening and a second opening, said first opening being adapted to receive said liquid and further being disposed above a normal liquid level line of said liquid when present in said container, said second opening being disposed below said normal liquid level line; and
    a tube having a first end and a second end, said first end being attachable to said container in fluid communication with said second opening, said second end being normally positionable above said liquid level line; and
    a mounting bracket adapted to be normally engaged to said selected one of said seat rail and said seat post, said bracket having a mounting tab extending upwardly rearward therefrom;
    said container further having an exterior slot, said tab being receivable in said slot in slideable engagement.

2. A liquid delivery apparatus as set forth in claim 1 further comprising:
    a mouthpiece having an orifice therethrough, said second end of said tube being attachable to said mouthpiece in fluid communication with said orifice.

3. A liquid delivery apparatus as set forth in claim 1 wherein said container has a top portion and a bottom portion, said bottom portion being angularly disposed with respect to said top portion.

4. A liquid delivery apparatus as set forth in claim 3 wherein said bottom portion is adapted to be at least partially disposed under said seat when said container is mounted to said selected one of said seat rail and said seat post.

5. A liquid delivery apparatus as set forth in claim 3 wherein said slot is disposed on said bottom portion.

6. A liquid delivery apparatus as set forth in claim 1 wherein said container has a top portion, said top portion having a generally cylindrical recess defined by a cylindrical wall extending into said container and an end wall disposed at a distal end of said cylindrical wall, said first opening being disposed in said end wall.

7. A liquid delivery apparatus as set forth in claim 6 wherein said recess is adapted to receive an inverted commercially available liquid containing bottle to introduce said liquid into said container.

8. A liquid delivery apparatus as set forth in claim 6 wherein said container further includes a cap removable disposed in said recess in engagement with said cylindrical wall.

9. A liquid delivery apparatus as set forth in claim 1 wherein said container further includes a liquid flow spigot attached to said container interposed said second opening and said first end of said tube.

10. A liquid delivery apparatus as set forth in claim 1 further comprising a clamp to secure said tube to said handlebar.

11. A liquid delivery apparatus as set forth in claim 10 further comprising a flexible semi-rigid tube sheath disposed about said tube between said second end and said clamp such that said second end of said tube projects outwardly from said tube sheath.

12. A liquid delivery apparatus as set forth in claim 1 further comprising a pair of straps, each of said straps being adapted to secure said tube to said frame horizontal bar.

13. A liquid delivery apparatus as set forth in claim 12 wherein said straps are fabric hook and loop fasteners.

* * * * *